No. 894,333.
PATENTED JULY 28, 1908.
J. LEDWINKA.
ELECTRICALLY PROPELLED VEHICLE.
APPLICATION FILED MAY 19, 1906.
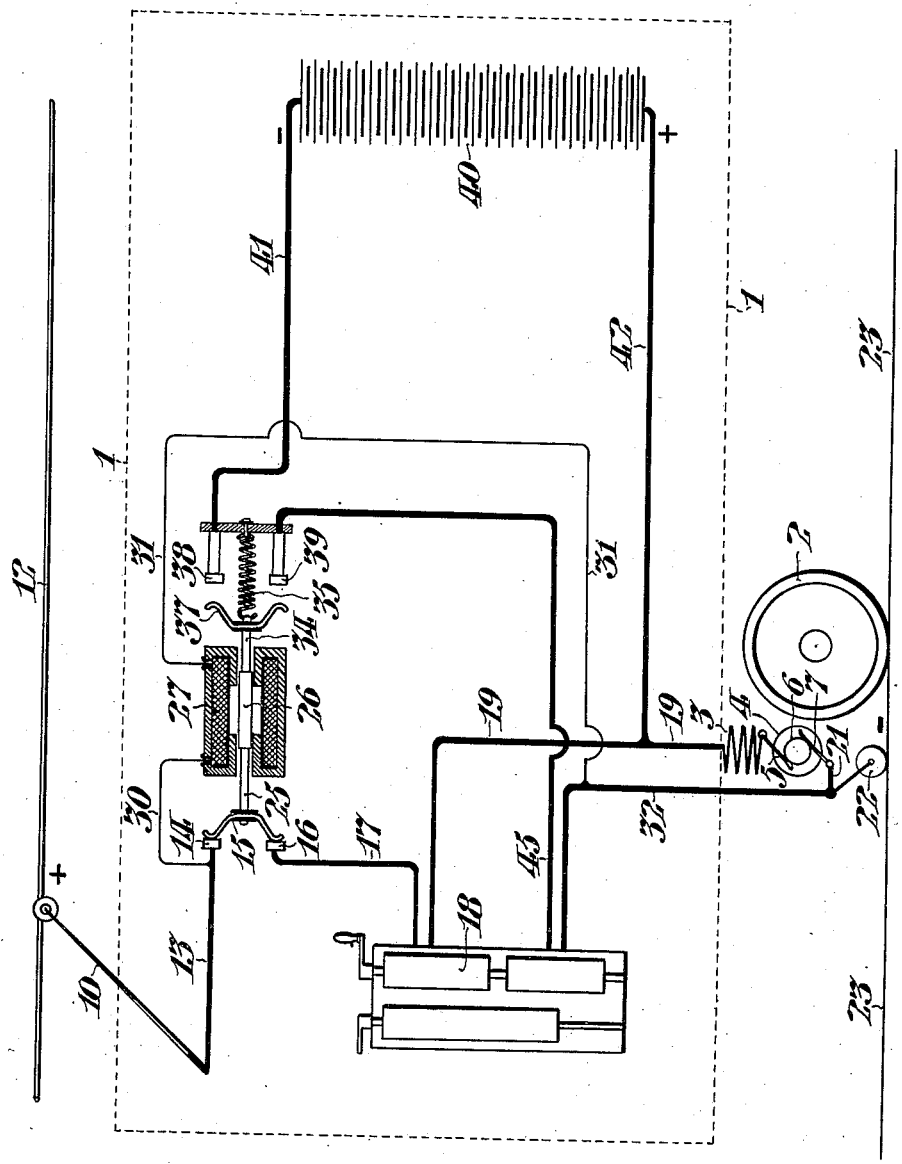
WITNESSES:
INVENTOR.
JOSEPH LEDWINKA,
BY
ATTORNEYS.

UNITED STATES PATENT OFFICE.

JOSEPH LEDWINKA, OF PHILADELPHIA, PENNSYLVANIA, ASSIGNOR TO RUSSELL THAYER, OF PHILADELPHIA, PENNSYLVANIA.

ELECTRICALLY-PROPELLED VEHICLE.

No. 894,333.　　　　　Specification of Letters Patent.　　　Patented July 28, 1908.

Application filed May 19, 1906. Serial No. 317,709.

*To all whom it may concern:*

Be it known that I, JOSEPH LEDWINKA, a citizen of the United States, residing in the city of Philadelphia, county of Philadelphia, and State of Pennsylvania, have invented a certain new and useful Improvement in Electrically-Propelled Vehicles, whereof the following is a specification, reference being had to the accompanying drawings.

My improvement is applicable to any electrically propelled vehicle which derives its motor current alternately from an external supply system and from a storage battery carried by the vehicle. Such vehicles may be employed in connection with a railway supply system whose electric circuit includes a single overhead wire and subjacent tracks, or a trackless system whose electric circuit comprises two overhead wires for connection with the vehicle, or a system with which the vehicles are otherwise connected.

It is the object of my invention to provide means to instantly and automatically change the circuit connections of the motor of such a vehicle, from the external supply circuit to the internal battery supply circuit, and conversely so as to insure that said motor shall always be in connection with one or the other source of energy and not in connection with both contemporaneously.

As hereinafter described my improvement comprises a solenoid coil, a core carrying switch members, and a counterbalance for said core; whereby the circuit connections are changed, as aforesaid, as the consequence of making or breaking electrical connection between the vehicle and the external supply circuit.

My invention comprises the various novel features of construction and arrangement hereinafter more definitely specified and claimed.

The drawing is a diagrammatic view showing the essential elements included in the electrical circuit carried by the vehicle, in connection with an overhead supply wire and a subjacent track both comprised in a railway supply system.

In said drawing; the dotted outline 1, indicates the vehicle having the supporting wheel 2 in operative relation with the vehicle motor comprising the field 3, armature 4, brush 5, commutator 6, and brush 7. The vehicle carries the adjustable contact pole indicated at 10, arranged to electrically connect with the overhead supply wire 12. In the position of the apparatus shown in the drawing, said motor is in operative connection with the external supply system, and the circuit is established through the pole 10, lead 13, switch terminal 14, switch bridge 15, switch terminal 16, lead 17, controller 18, lead 19, field 3, brush 5, commutator 6, brush 7, lead 21, and contact wheel 22, to the track 23. Said switch bridge 15, is carried on the stem 25, of the solenoid core 26, which is arranged to reciprocate within the solenoid coil 27, and, the circuit is maintained closed while the circuit is established between the wire 12, and the pole 10, by current in the branch circuit including the lead 30, from the lead 13, to the coil 27, and the lead 31, from said coil 27, to the lead 32, which connects with the lead 21.

The stem 34, extending from the core 26, oppositely to the stem 25, is provided with the spring 35, which automatically withdraws the bridge 15, by the core 26 and breaks the circuit between the terminals 14, and 16, and changes the connections of the motor from the external supply circuit to the internal supply circuit when the circuit is broken between the overhead supply wire 12, and the contact device 10. Said stem 34, carries the switch bridge 37, which electrically connects the switch terminals 38, and 39, when the spring 35 is permitted to act, by breaking the circuit as above described. The connection of said terminals 38, and 39, by the bridge 37, connects the motor aforesaid with the storage battery 40, by establishing the circuit through the terminal 38, lead 41, battery 40, lead 42, lead 19, field 3, brush 5, commutator 6, brush 7, lead 32, controller 18, lead 45, and terminal 39. Therefore, it is to be understood that the apparatus above described is automatically operative to instantly change the connections of the vehicle motor from the external supply circuit to the internal battery supply circuit, and conversely, so as to insure that said motor shall be supplied by one or the other source of energy without intermission, so that the vehicle may be continuously progressed; such change in the circuit connections being effected as a consequence of breaking or making connection with the external circuit, by raising or lowering the pole 10, and without any other manipulation of the apparatus.

It is to be understood that I do not desire to limit myself to the precise construction and arrangement herein described, as various modifications may be made therein without departing from the essential features of my invention.

I claim:

1. In an electrically propelled vehicle which derives its motor current alternately from an external supply system and from a storage battery carried by the vehicle, a motor; a motor controller; a storage battery; and, switch mechanism arranged to change the circuit connections of said motor from the external supply circuit to the internal supply circuit, comprising a solenoid coil in a circuit parallel with said controller, substantially as set forth.

2. In an electrically propelled vehicle which derives its motor current alternately from an external supply system and from a storage battery carried by the vehicle, a motor; a motor controller; a storage battery; and, switch mechanism arranged to change the circuit connections of said motor from the external supply circuit to the internal supply circuit, comprising a solenoid coil in a circuit parallel with said controller and independent of said battery circuit, substantially as set forth.

3. In an electrically propelled vehicle which derives its motor current alternately from an external supply system and from a storage battery carried by the vehicle, a motor; a motor controller; a storage battery; switch mechanism arranged to change the circuit connections of said motor from the external supply circuit to the internal supply circuit, comprising a solenoid coil in a circuit parallel with said controller; a solenoid core provided with means arranged to maintain said motor connected with said external supply circuit; and, mechanical means connected with said core, arranged to break the connection between said motor and the external supply circuit and establish the connection between said motor and the battery when the external supply circuit is broken, substantially as set forth.

4. In an electrically propelled vehicle, which derives its motor current alternately from an external supply system and from a storage battery carried by the vehicle, a motor; a motor controller; a storage battery; switch mechanism comprising electrically actuated means arranged to maintain said motor in connection with the external supply circuit when said circuit is closed; and, mechanical means arranged to establish the connection between said motor and said battery when the external supply circuit is broken, substantially as set forth.

5. In an electrically propelled vehicle, which derives its motor current alternately from an external supply system and from a storage battery carried by the vehicle, a motor; a motor controller; a storage battery; and, switch mechanism arranged to change the circuit connections of said motor from the external supply circuit to the internal supply circuit, comprising a solenoid coil in a circuit parallel with said controller, and with said motor, substantially as set forth.

In testimony whereof, I have hereunto signed my name, at Philadelphia, in the State of Pennsylvania, this 17th day of May, 1906.

JOSEPH LEDWINKA.

Witnesses:
CHARLES OLBERG,
W. WAYNE WIRGMAN.